United States Patent [19]

Sturm et al.

[11] Patent Number: 5,317,316
[45] Date of Patent: May 31, 1994

[54] METHOD OF ALTITUDE TRACK INITIALIZATION IN AN AIRCRAFT TRACKING SYSTEM

[75] Inventors: Patricia K. Sturm; Kathryn W. Ybarra, both of Phoenix; Lewis R. Motisher, Peoria, all of Ariz.

[73] Assignee: Honeywell Inc., Minneapolis, Minn.

[21] Appl. No.: 995,274

[22] Filed: Dec. 22, 1992

[51] Int. Cl.$^5$ .............................................. G01S 13/00
[52] U.S. Cl. ........................................ 342/30; 342/32; 342/37; 342/40
[58] Field of Search ........................ 342/29, 30, 36, 37, 342/40, 32

[56] References Cited

U.S. PATENT DOCUMENTS 5,081,457  1/1992  Motisher et al. .................. 342/40
5,107,268  4/1992  Sturm et al. ...................... 342/36

OTHER PUBLICATIONS

U.S. patent application Ser. No. 07/968,100 "A Method of Reducing False Track Due to Suppression Pulse Replies in an Aircraft Tracking System".
U.S. patent application Ser. No. 07/767,007 "Method of Bearing Determination Utilizing a Bottom Antenna in an Aircraft Tracking System".
U.S. patent application Ser. No. 07/976,150 "A Method of Improved Initial Transmission of Acquisition and Tracking Interrogations in an Aircraft Tracking System".
U.S. patent application Ser. No. 07/687,965, Ybarra, et al., Improved Track Extension for Use with ATCRBS Surveillance Procedures.
Minimum Operational Performance Standards for Traffic Alert and Collision Avoidance System (TCAS) Airborne Equipment, vol. I and II, Consolidated Edition, Document No. RTCA/DO-185, Sep. 23, 1983, Consolidated Sep. 6, 1990, Radio Technical Commission for Aeronautics.
ATA Standard for TCAS II Displays, Symbology and Controls, Revision A, Sep. 1, 1989, Air Transport Association of America.
"Airworthiness Approval of Traffic Alert and Collision Avoidance Systems (TCAS II) and Mode S Transponders", Advisory Circular, U.S. Department of Transportation, Federal Aviation Administration, Apr. 27, 1990.

Primary Examiner—Mark Hellner
Attorney, Agent, or Firm—Mark J. Gebhardt

[57] ABSTRACT

A method of processing a plurality of replies of target aircraft provided in response to interrogation signals from the surveillance aircraft during surveillance periods to determine whether an altitude track may be initialized for use in a traffic alert and collision avoidance system includes the step of selecting three replies, one from each of three consecutive surveillance periods. The replies have binary or coded altitude data of high or low confidence. The binary or coded altitude data of non-adjacent and adjacent replies of the selected replies are compared and an altitude difference value for each of the comparisons is generated. Further efforts to initialize a track are discarded if any of the altitude difference values are greater than first predetermined separated altitudes if and only if such compared non-adjacent and adjacent replies have binary or coded altitude data of high confidence. The binary or coded altitude data of the non-adjacent and adjacent replies are further compared whether or not the replies have binary data of low or high confidence to determine whether an altitude track may be initialized. The process applies if the altitude data is Gilham code, binary, or other encoded data with single bit errors.

7 Claims, 11 Drawing Sheets

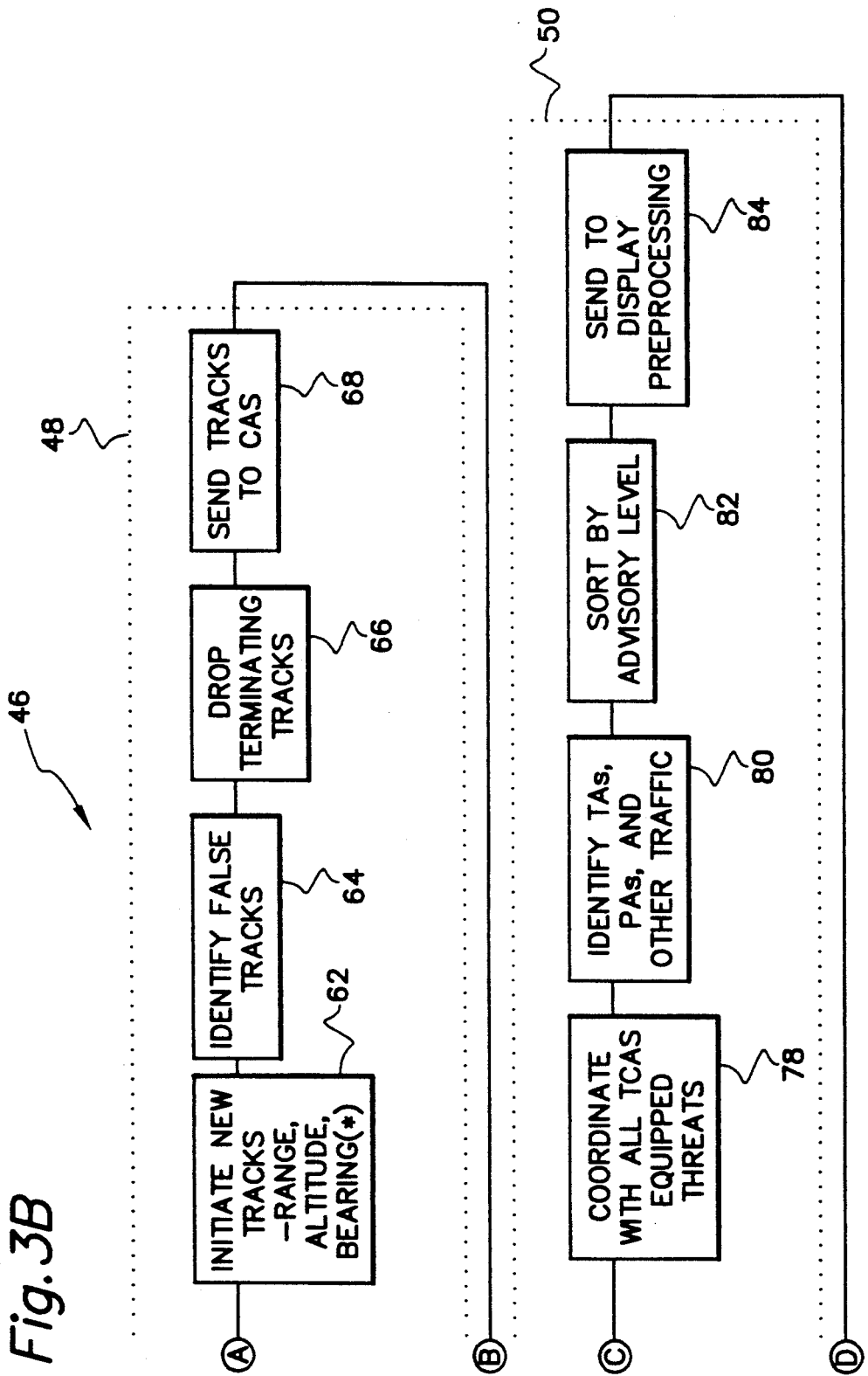

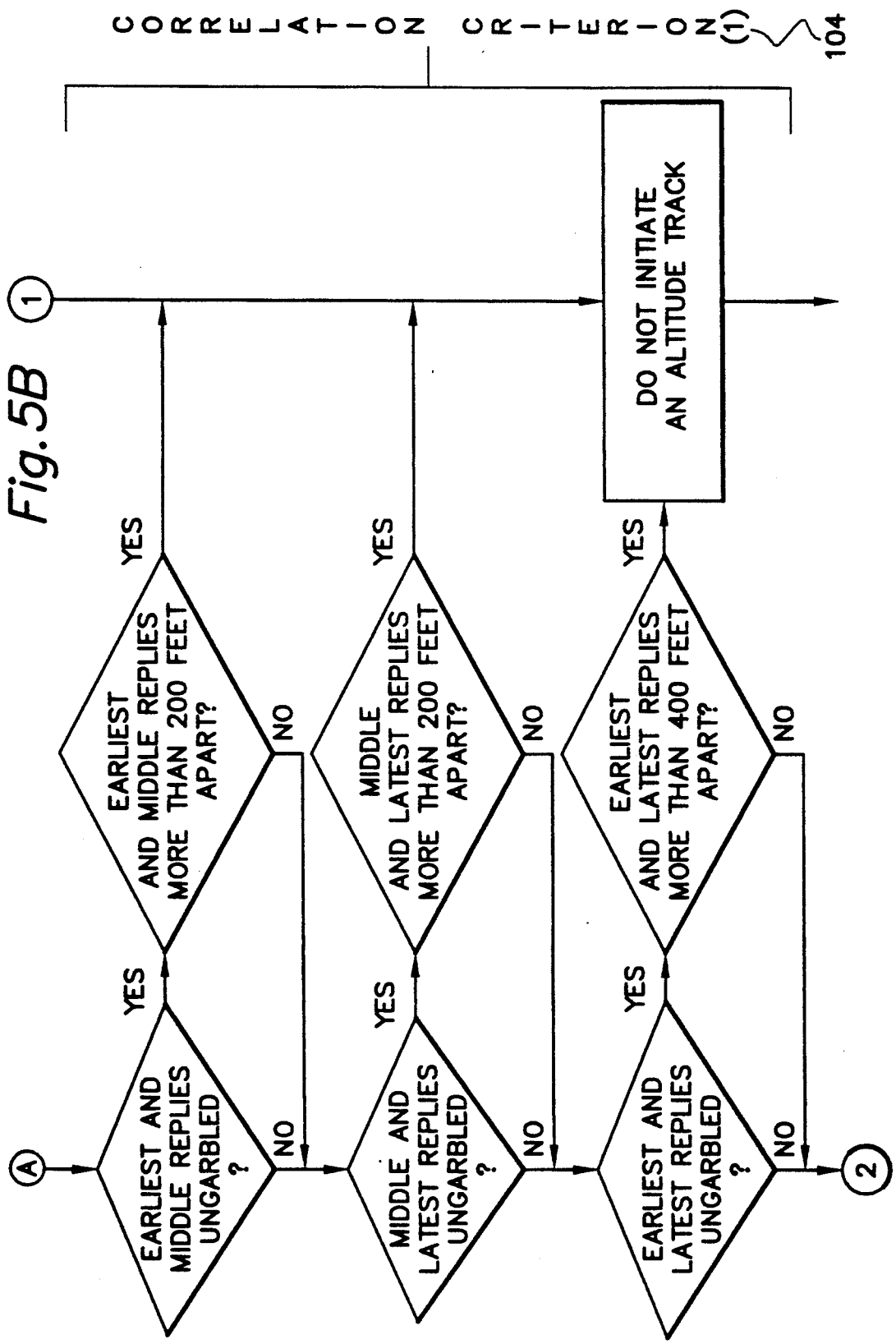

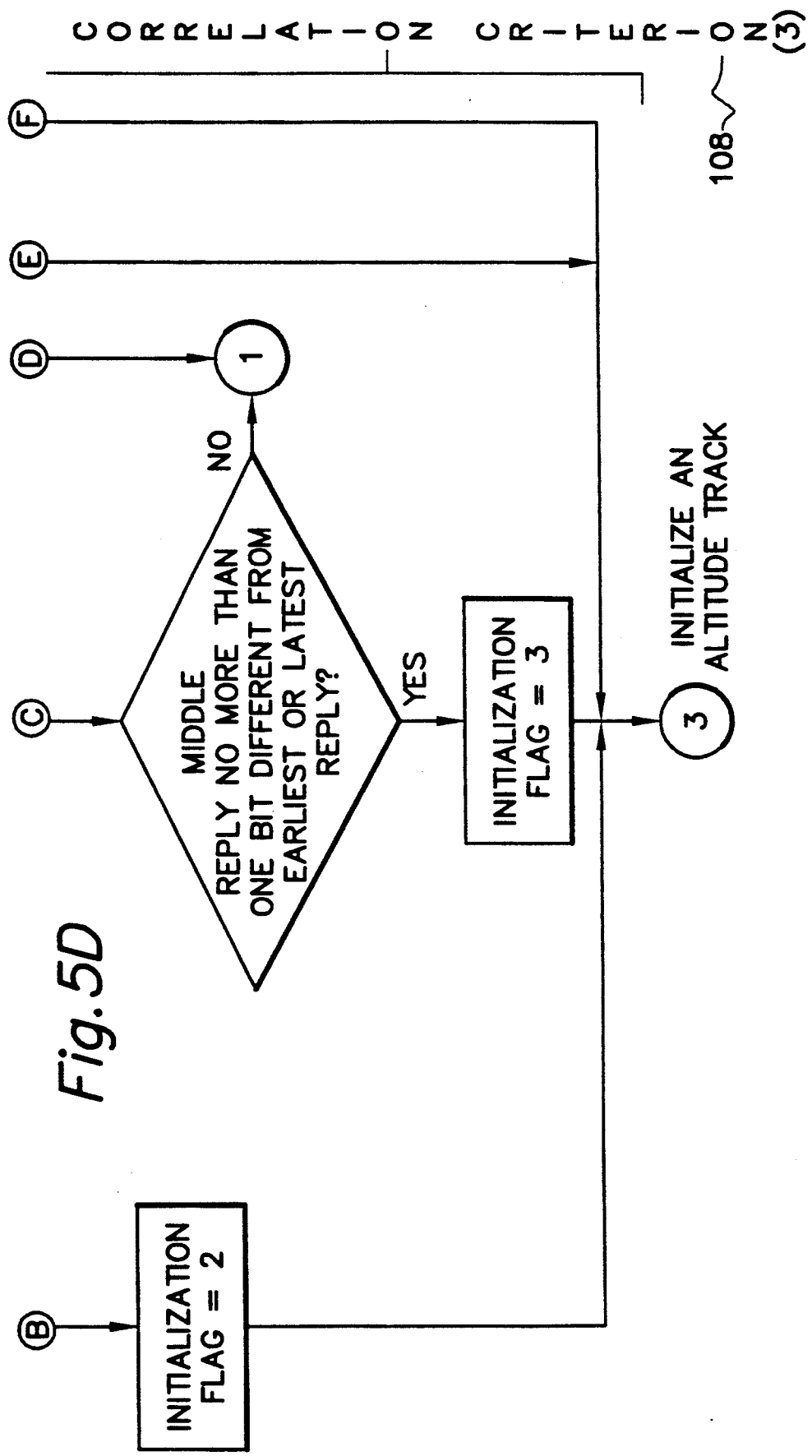

METHOD OF ALTITUDE TRACK INITIALIZATION IN AN AIRCRAFT TRACKING SYSTEM

FIELD OF THE INVENTION

The present invention relates to surveillance of aircraft traffic in a Traffic Alert and Collision Avoidance System (TCAS). More particularly, the present invention pertains to an altitude track initialization method for initializing altitude tracks representative of target aircraft for use in a TCAS.

BACKGROUND OF THE INVENTION

The increased demands placed on an aircraft flight crew as a result of more complex technology, ever increasing aircraft traffic, and increased demands for safety has brought about a requirement for monitoring aircraft traffic in the vicinity of an aircraft. Such monitoring includes the automatic identification of potential threats to a surveillance aircraft monitoring target aircraft in such vicinity. As a result, aircraft have transponders which in response to appropriate interrogation signals generate reply signals that may provide information with respect to the range, altitude and bearing of the target aircraft. Certain traffic control system transponders, such as the Mode S system include unique aircraft identifiers so that each aircraft is interrogated separately and each reply is stamped with the identity of the target aircraft. This significantly simplifies surveillance processing by the surveillance aircraft.

In systems such as the Air Traffic Control Radar Beacon System, (ATCRBS), which do not include unique aircraft identifiers in reply to interrogation signals, the determination of tracks representative of target aircraft from the processing of such replies is more difficult. The information obtained from the replies provided by the target aircraft in response to periodic interrogation of target aircraft by the surveillance aircraft during surveillance periods may contain range, altitude and bearing information. Such information is subjected to algorithms in a TCAS to provide a target aircraft track. Once a track is identified and initialized, then the track can be updated and stabilized while continually monitoring the track to determine if the target aircraft represented by the track is a threat to the surveillance aircraft.

Track determination is complicated for several reasons generally involving multipath and spurious target aircraft replies. A surveillance aircraft transmits an interrogation signal to target aircraft whereupon a transponder in the target aircraft provides a reply signal containing encoded data. Numerous replies from a single target aircraft can be received by the surveillance aircraft due to ground reflection and other replies may be false due to electromagnetic interference or other effects. Three replies in consecutive surveillance periods meeting various requirements, such as range requirements and altitude requirements, are utilized to initiate a track. In the case of Mode S transponder equipped target aircraft, such Mode S aircraft are identified by reception of squitters therefrom. If the surveillance aircraft received squitters indicating that the new target aircraft should be tracked, then interrogations are sent by the surveillance aircraft and replies are provided by the target aircraft with identifiers to provide for tracking. Therefore, target aircraft track initialization processes utilizing reply information as opposed to Mode S identifiers relate only to the initialization of tracks for target aircraft utilizing ATCRBS transponders.

One track initialization method which relates only to the altitude requirements for initializing an altitude track for target aircraft is suggested in Minimum Operational Performance Standards (MOPS) for Traffic Alert and Collision Avoidance System (TCAS) Airborne Equipment manual document No. DO-185 by the Radio Technical Commission for Aeronautics (RTCA) which governs the operation of aircraft collision avoidance apparatuses. The MOPS method includes use of an altitude correlation table to determine whether three replies from three consecutive surveillance periods correlate such that the altitude requirements for initializing a track are satisfied and for determining the initial altitude of such a track if initialized. The replies contain eleven bits of Gilham altitude data. The three altitude replies are said to correlate if they meet certain requirements implying that they are likely to be from the same intruder. The eleven bits of Gilham altitude data are used to determine the altitude from each reply of a target aircraft. Each altitude bit from each reply also has an associated confidence level, either high or low.

The MOPS initialization table groups corresponding altitude bits from each of the three replies, one from each surveillance period, along with their confidence levels to produce a table of 64 possible output combinations of altitude bits and bit agreement. The 11 bits are D2, D4, A1, A2, A4, B1, B2, B4, C1, C2, and C4. If the table produces bit agreement on all eight D, A and B bits or if it produces bit agreement on seven of the D, A and B bits and on at least one of the C bits, then the three replies correlate and according to the altitude requirements, a track may be initialized if other requirements such as range requirements are satisfied. Since each group of three bits, one from each reply, are handled independently of the other ten bits in the Gilham altitude code, strange altitude initializations occur. In addition, strange initial altitudes for such tracks are created from the replies which are said to correlate. For example, in some cases the initial altitude of the track is set at or near the altitude of one of the replies which is significantly different than the other two replies which have matching altitudes.

These false altitude initializations may lead to false tracks being created representative of target aircrafts. Such false tracks may lead to false traffic advisories or resolution advisories. When such traffic advisories or resolution advisories are displayed to the flight crew on a traffic advisory or resolution advisory display, these false tracks become a distraction to the flight crew and can cause an unsafe maneuver comand. Therefore, there is a need for a improvement in altitude track initialization methods to reduce the number of false altitude track initializations.

SUMMARY OF THE INVENTION

The present invention is directed to a method of processing a plurality of replies of target aircraft provided in response to interrogation signals from a surveillance aircraft during surveillance periods to determine whether an altitude track may be initialized for use in traffic alert and collision avoidance systems. The method includes the step of selecting three replies, one from each of three consecutive surveillance periods. The replies have binary or coded altitude data of high or low confidence. The binary or coded altitude data of non-adjacent and adjacent replies of the selected replies are compared and an altitude difference value for each of the comparisons is generated. Further efforts to initialize a track are discarded if any of the altitude difference values are greater than first predetermined separated altitudes and only if such non-adjacent and adjacent replies have binary or coded altitude data of high confidence. The binary or coded altitude data of the non-adjacent and the adjacent replies are further compared whether or not the replies have binary data of low or high confidence to determine whether an altitude track may be initialized.

In a further embodiment of the invention, the further comparison step includes the step of correlating the selected replies such that the selected replies may be utilized to initiate an altitude track regardless of whether the replies have binary or coded altitude data of high or low confidence if the altitude difference values of compared adjacent replies are less than second predetermined separated altitudes. In addition, the selected replies are correlated regardless of whether the replies have binary or coded altitude data of high or low confidence if the altitude difference value of one of the compared adjacent replies or the non-adjacent replies is less than third predetermined separated altitudes and only if the binary or coded altitude data of the replies of the one of the compared adjacent replies or the non-adjacent replies is not more than one bit different than the binary or coded altitude of the reply which is not a part of the one of the compared adjacent replies or the non-adjacent replies which were less than the third predetermined separated altitudes.

In yet a further embodiment of the invention, the method includes the step of selecting an initial altitude of an altitude track allowed to be initialized upon correlation of the selected replies. The selecting step includes the step of choosing the altitude of the reply of the most recent surveillance period in which the reply has binary or coded altitude data of high confidence. Otherwise, the altitude of the reply in the most recent surveillance period of the one of compared adjacent replies or non-adjacent replies leading to the initialization of a track is selected if all the selected replies have binary or coded altitude data of low confidence.

BRIEF DESCRIPTION OF THE DRAWINGS

FIGS. 3A and 3B show a block diagram of primary TCAS processes for a TCAS/transponder system as shown in FIG. 2.

FIGS. 5A–5E, referred to herein as FIG. 5, is a flow diagram of an ATCRBS altitude initialization process of the primary TCAS processes shown in FIG. 3.

DETAILED DESCRIPTION OF THE PREFERRED EMBODIMENT

Figure 1:
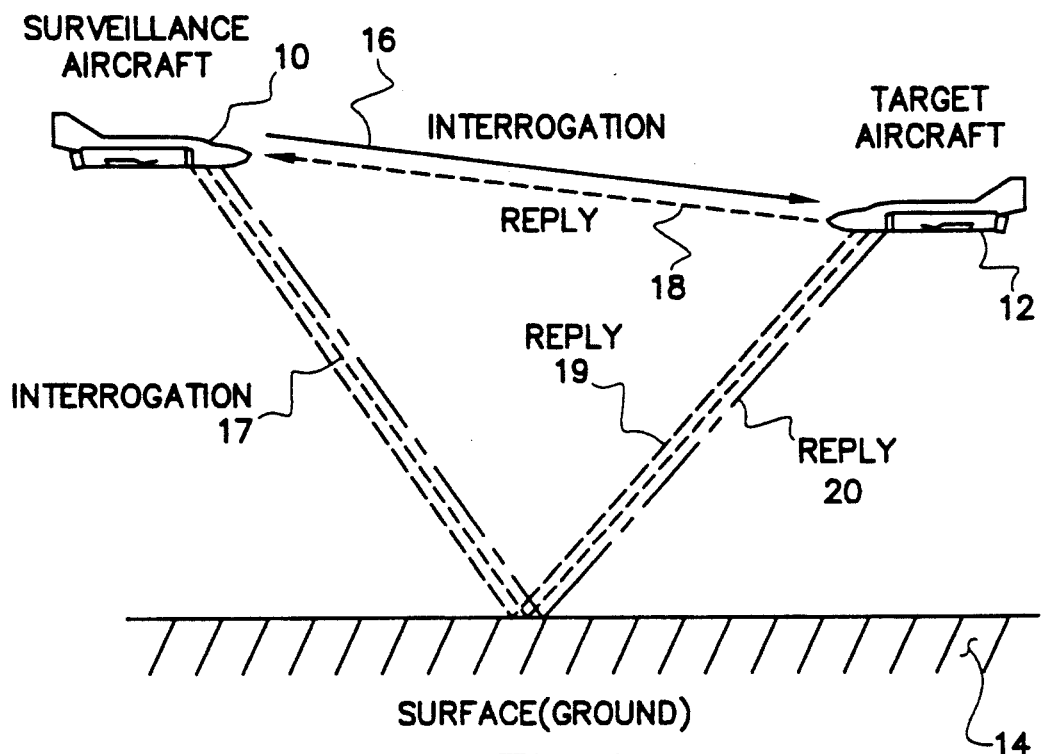
FIG. 1 shows a diagram of possible signal paths of target aircraft replies in response to surveillance aircraft interrogation signals.

Referring to FIG. 1, there is shown a surveillance aircraft 10 engaged in an interrogation-reply process with target aircraft 12. The surveillance aircraft 10, having a TCAS/transponder system 22, FIG. 2, interrogates all target aircraft, including target aircraft 12, in the vicinity of the surveillance aircraft 10 in order to determine potentially dangerous situations. The TCAS/transponder system 22 includes transponder system 26, TCAS computer unit 24, TCAS displays 28, means for presenting aural messages 30, a top directional antenna 32 and a bottom omni-directional or directional antenna 34. TCAS/transponder system 22, installed on the surveillance aircraft 10, utilizes ATCRBS transponders and Mode S transponders installed in target aircraft to provide locations of such target aircraft, including target aircraft 12, in the immediate vicinity of the TCAS/transponder equipped surveillance aircraft. TCAS/transponder system 22 provides surveillance of ATCRBS equipped target aircraft by transmitting interrogation signals 16 to the ATCRBS equipped target aircraft and measuring the relative range, altitude and bearing, if available, from the replies, such as reply 18 from the ATCRBS transponder of the target aircraft 12. The measured data and the rate of change of this data is utilized by TCAS computer unit 24 to provide a prediction of target aircraft penetration into a predetermined TCAS protection volume for a subsequent flight time. When target aircraft penetration is predicted within this volume and time, an advisory is given to the flight crew to take corrective action.

TCAS computer unit 24 of surveillance aircraft 10 interfaces to the top directional antenna 32 and to the bottom directional antenna 34. The bottom directional antenna 34 may instead be an omni-directional antenna. The TCAS computer unit 24 outputs interrogations and listens for replies from target aircraft provided in response to these interrogations through top and bottom directional antennas 32, 34. As shown in FIG. 1, the interrogation signal 16 transmitted by surveillance aircraft 10 may result in another interrogation signal 17 which is reflected off ground 14 to target aircraft 12. A direct reply 18 is provided by target aircraft 12 in response to interrogation 16. Such a direct reply 18 may also result in another reply 19 which is reflected off ground 14 to surveillance aircraft 10. In addition, an additional reply 20 may be reflected off the ground representative of a reply to the interrogation signal 17 reflected off ground 14. Such multiple replies from a single target aircraft, commonly referred to as multipath replies, complicate the identification of a target aircraft track by the TCAS computer unit 24. In addition, spurious replies may be provided by target aircraft 12 due to electromagnetic interference, a target aircraft responding to ATCRBS interrogations from other ground or airborne interrogators, or other effects. Such spurious replies further complicate the identification of target aircraft tracks.

Figure 2:
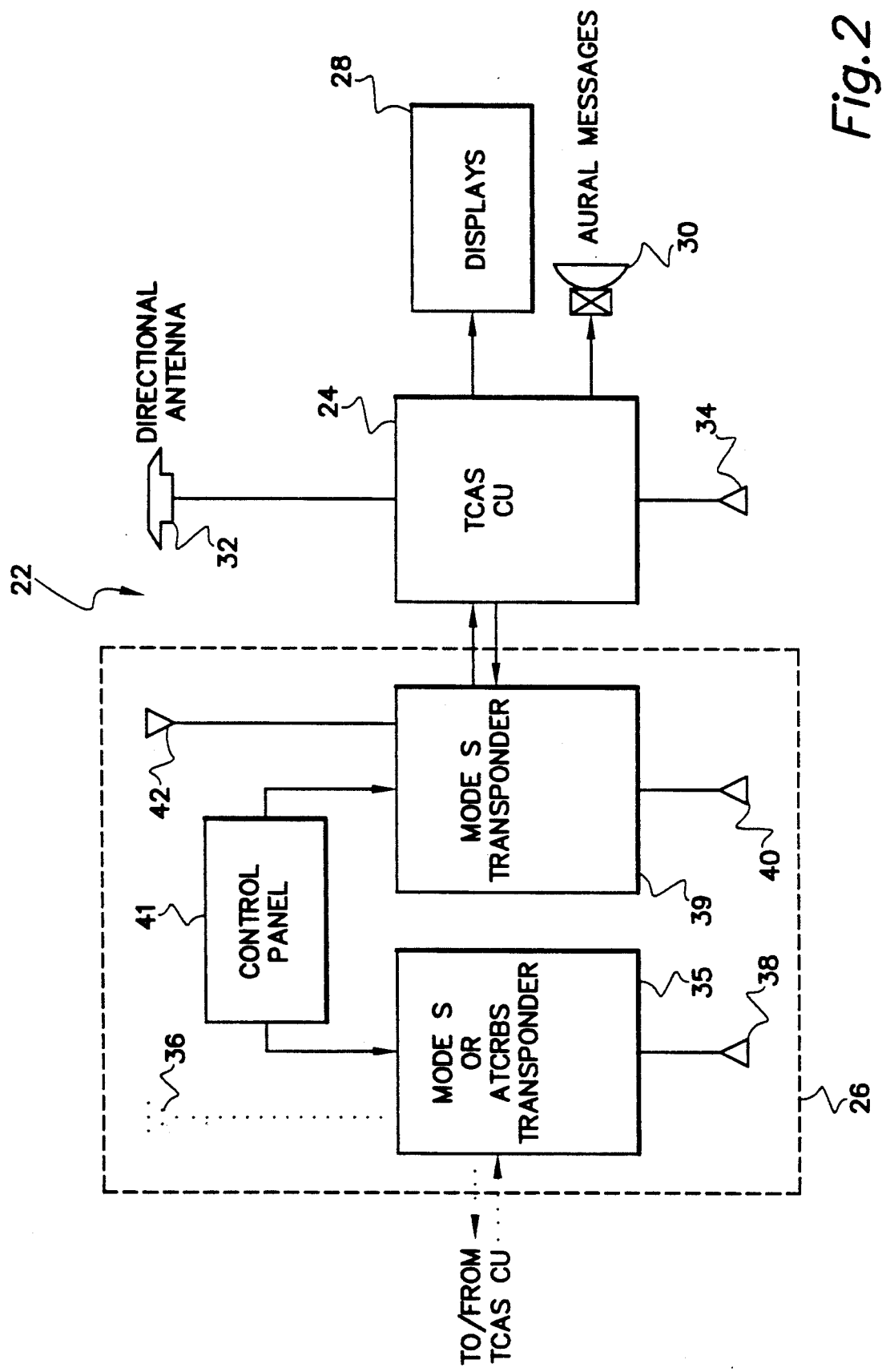
FIG. 2 is a block diagram of a TCAS/transponder system in which the present invention is utilized.

TCAS computer unit 24 works in cooperation with transponder system 26. The dual transponder system 26 includes a Mode S transponder 39, a Mode S or an ATCRBS transponder 35 and a control panel 41 used to control the transponders 35, 39 and TCAS system 22. The transponder system 26 as shown in FIG. 2 is the transponder system of the surveillance aircraft 10 and is not the transponder system of the target aircraft 12. The transponder system of target aircraft 12 is not shown and may include either a Mode S transponder, an ATCRBS transponder or both. Mode S transponder 39 interfaces with omni-directional antenna 42 and omni-directional antenna 40 to provide and receive Mode S interrogations and replies. The Mode S transponder 39 directly interfaces with the TCAS computer unit 24. If transponder 35 is a Mode S transponder, the Mode S transponder 35 also interfaces with TCAS computer unit 24 and is associated with omni-directional antenna 36 and omni-directional antenna 38. However, if transponder 35 is an ATCRBS transponder, omni-directional antenna 36 is unnecessary and the local ATCRBS transponder 35 does not interface to computer unit 24 and the TCAS computer unit 24 is not operational if the ATCRBS transponder is selected. The local ATCRBS transponder 35 of surveillance aircraft 10 would be for providing replies from the surveillance aircraft 10 to other surveillance aircrafts or ground stations which have transmitted interrogation signals thereto.

The TCAS computer unit 24 processes replies of target aircraft with two types of transponders, ATCRBS and Mode S transponders. In the case of ATCRBS equipped target aircraft, there is no unique aircraft identifier, so the process of identifying and tracking target aircraft is complicated since it is necessary for a surveillance process to determine which replies belong to which target aircraft and to reject multiple replies, as discussed above, from a single target aircraft. In the case of Mode S equipped target aircraft, there is a unique aircraft identifier, so each target aircraft is interrogated separately and each reply is stamped with the identity of the responding aircraft simplifying the tracking process.

Figure 3A:
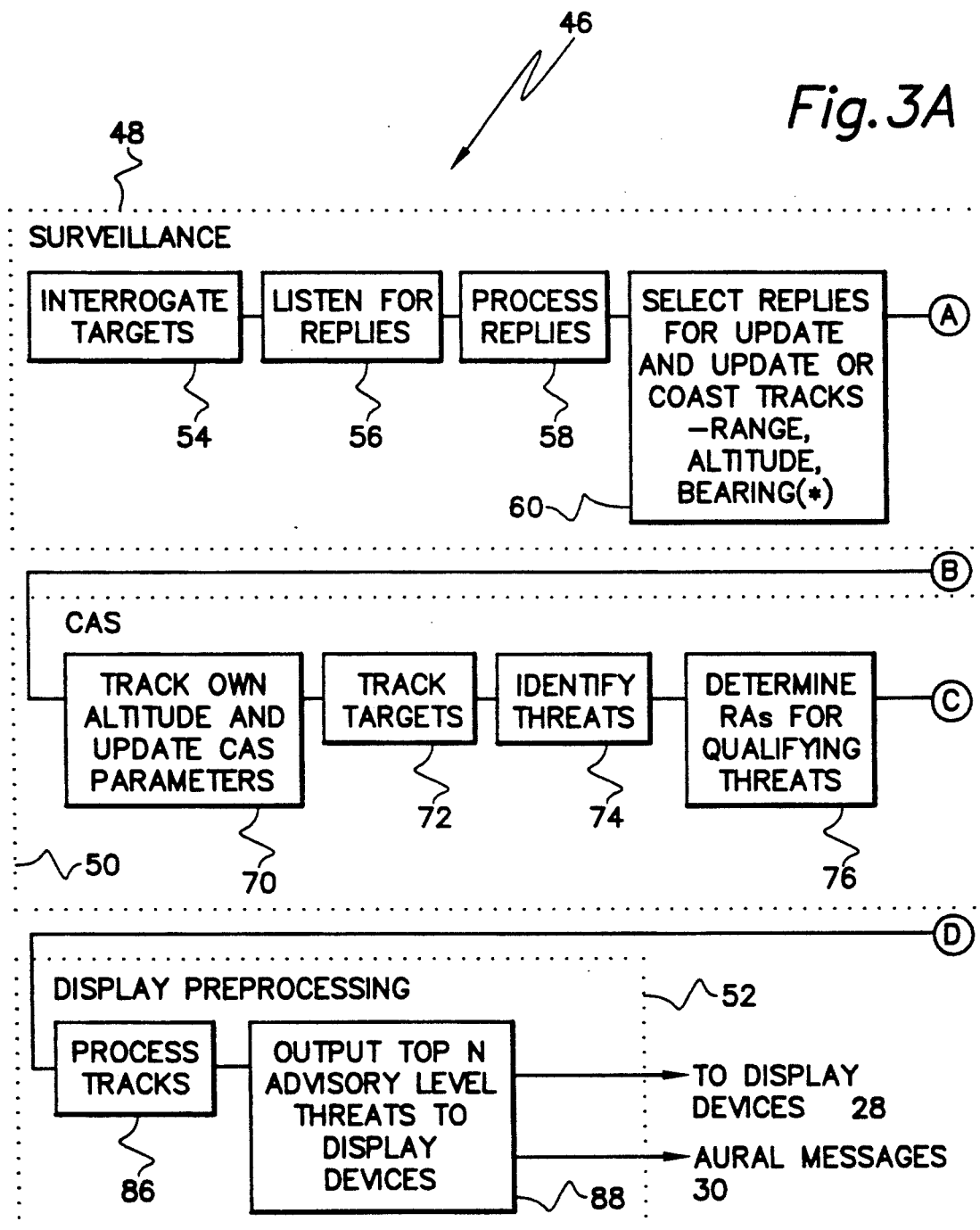

The TCAS computer unit 24 of the surveillance aircraft 10 includes algorithms for executing primary TCAS processes 46, FIG. 3, utilizing information from the interrogation-reply method. In particular, the primary TCAS processes 46 include surveillance process 48 which identifies target aircraft and provides collision avoidance system (CAS) process 50 with target aircraft data. Collision avoidance system process 50 determines the threat level of the target aircraft from the data supplied by the surveillance process 48 and furnishes such threat level information to display preprocessing 52 such that the threat level information can then be furnished to the pilot through display devices 28 and means for presenting aural messages 30.

FIG. 3 shows in block diagram form, an overview of the primary TCAS processes 46. It should be indicated that FIG. 3 is simplified and does not show the exact sequence of processing events. For example, the TCAS/transponder system 22 interrogates ATCRBS equipped target aircraft using an interrogation sequence consisting of approximately 100 steps. After each step, the TCAS/transponder system listens for replies. At the end of all of the ATCRBS interrogations of the ATCRBS equipped target aircraft, the TCAS computer unit 24 by means of the TCAS primary processes 46 processes the ATCRBS replies and tracks of target aircraft resulting therefrom. Some of the ATCRBS processing takes place concurrently with Mode S processing. Surveillance process 48 interrogates each qualified Mode S target aircraft. After each Mode S interrogation, TCAS system 22 listens for replies, processes replies, and updates the tracks. Timing for such concurrent processing is not shown in FIG. 3.

Surveillance process 48 of the primary TCAS processes 46 includes the execution of various program processes. Surveillance process 48 interrogates target aircraft (Block 54) by performing a predetermined interrogation sequence transmitting interrogation signals such as interrogation signal 16 to target aircraft 12. The surveillance process 48 then listens for replies from target aircraft (Block 56). The replies provided by target aircraft are then processed (Block 58) to eliminate duplicate replies and false replies. For example, the duplicate replies would be replies such as reply 18 and reply 19, of FIG. 1, wherein reply 19 is made in response to the same interrogation signal 16 as reply 18 only provided off of ground 14. False replies may include reply signals which are a result of electromagnetic interference, or any other uncertainty or effect.

After such elimination of duplicate and false replies, surveillance process 48 then selects the replies for which tracks have been previously identified for particular target aircraft (Block 60) such that the previously identified tracks can be updated with new information. If a reply for a previously identified track cannot be located, this previously identified track is coasted (Block 60). Such coasted tracks if not updated for a sufficient period of time, for example six surveillance periods, are dropped and no longer followed or updated. When all the previously identified tracks of target aircraft are updated, the surveillance process 48 proceeds to determining and initiating new tracks having particular range, altitude and bearing, (Block 62) if available.

The altitude track initialization process 100, FIG. 5, in accordance with the principles of the present invention, forms a part of the track initialization process (Block 62) and shall be discussed further below in detail. In the case of ATCRBS transponder equipped target aircraft, the replies from such aircraft which are remaining after reply processing (Block 58) and track updating (Block 60) are used to initiate new tracks. The altitude track initialization process 100 relates only to ATCRBS altitude reporting target aircraft and not Mode S transponder equipped target aircraft because in the case of Mode S equipped target aircraft, target aircraft are identified by reception of their squitters. If the received squitters indicate that a Mode S equipped target aircraft should be tracked, then tracking interrogations are made and the replies in response thereto are processed. As such, the altitude track initialization process 100 of the present invention relates only to ATCRBS altitude reporting target aircraft.

Following the initialization of new tracks, false tracks and duplicate tracks are identified (Block 64). For example, algorithms are applied to the identified tracks and updated tracks to indicate whether two duplicate tracks of the same target aircraft should be merged and therefore one of the tracks duplicate thereof is dropped. Following the identification of the duplicate and false tracks and merging thereof, coasting tracks which have not been updated for a certain period of time, as discussed above, are dropped (Block 66) and tracks containing substantially good information are sent to CAS process 50 (Block 68).

Collision avoidance system process 50 receives the data concerning the tracks from surveillance process 48. The CAS process 50 tracks its own altitude, i.e. surveillance aircraft altitude, and selects CAS parameters such as threat protection volume parameters based on selected sensitivity levels, altitude bands, etc. (Block 70). The tracks from the surveillance process 48 along with the tracking data for itself are used to track the target aircraft represented by the tracks (Block 72). The CAS process 50 then determines which target aircraft qualify as threats to the surveillance aircraft 10 (Block 74). If there are any qualifying threats from target aircraft, then a resolution advisory is determined for the threats (Block 76). If there are multiple threats, all the threats are considered and a single, composite resolution advisory is issued (Block 76). The resolution advisory intent is communicated to the target aircraft to assure complementary advisories (Block 78). The target aircraft which pose threats to the surveillance aircraft 10, are identified by various advisory levels, including resolution advisories, traffic advisories, proximate traffic advisories, and other traffic advisories (Block 80). The advisory levels of the target aircraft which pose potential threats to the surveillance aircraft 10 are then sorted by advisory level (Block 82) and sent to display preprocessing 52 (Block 84). Display preprocessing 52 receives the list of tracks sorted by advisory level for display on display device 28, and processes the tracks (Block 86) utilizing such apparatuses as a graphics processor. The display preprocessing 52 outputs N number of advisory level tracks representing threatening target aircraft (Block 88) to the display devices 28 and may issue an aural message for particular advisory level target aircraft by means of aural presenting device 30 which may be any appropriate annunciation device. The display device may further limit the number of target aircraft displayed. The surveillance process 48 and CAS process 50 are further described in U.S. Pat. No. 5,107,268 to Sturm et al issued Apr. 21, 1992 and entirely incorporated herein by reference thereto.

Figure 4:
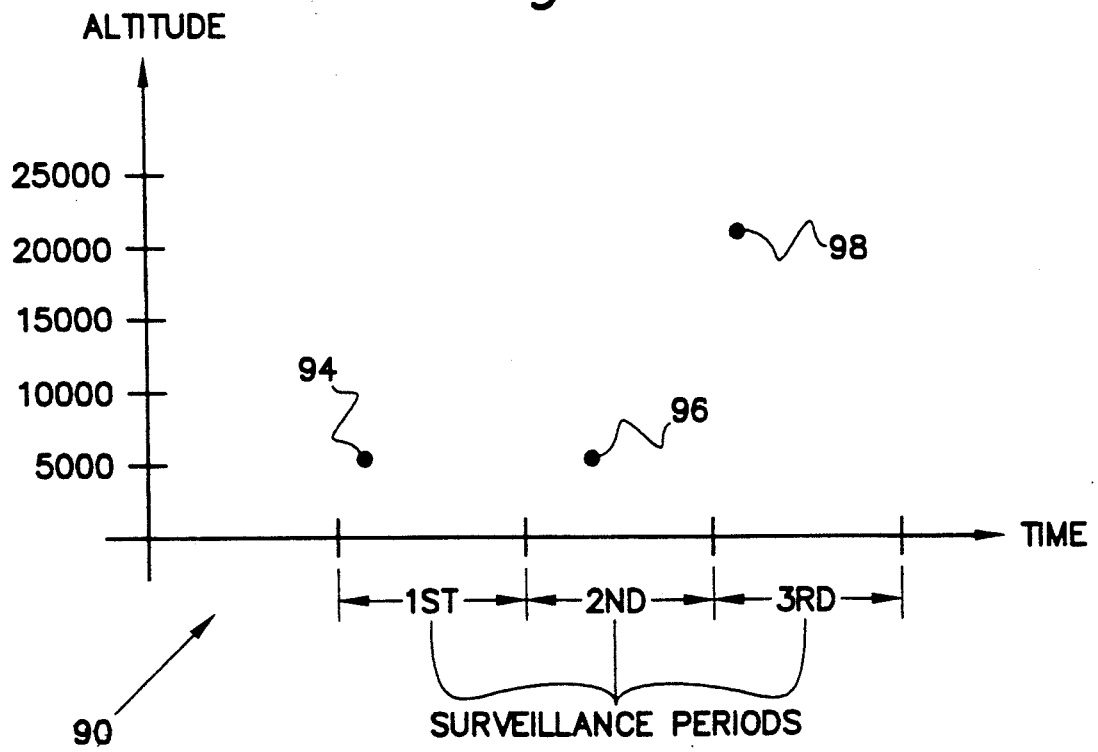
FIG. 4 is a charted illustration of reply altitudes during a period of time.

As explained above with regard to the primary TCAS processes 46, the altitude track initialization process 100 of the present invention pertains to the initialization of new tracks (Block 62) for ATCRBS altitude reporting target aircraft. The altitude track initialization process 100 shall be further described in detail with reference to FIGS. 4-6. The interrogation of target aircraft (Block 54) of surveillance process 48, as indicated above, performs a predetermined interrogation sequence during surveillance periods. Such surveillance periods are illustrated in FIG. 4 at numeral 90. After the interrogation sequence of a surveillance period is completed, reply data received in response to the interrogation by surveillance aircraft 10 is stored and the previously identified tracks of target aircraft are updated (Block 60). After the previously identified tracks for target aircraft are updated (Block 60), the altitude track initialization process 100 of the present invention is used to determine whether three replies from consecutive surveillance periods can be used to initiate a track for a target aircraft. Predetermined track initiation criteria must be met by replies from three consecutive surveillance periods in order to initiate a new track. Such predetermined conditions include altitude conditions and range conditions. The altitude track initialization process 100 relates only to the altitude conditions for altitude track initialization. Therefore, even if the altitude initialization process 100 indicates that three replies from consecutive surveillance periods correlate in terms of the predetermined altitude conditions, range conditions may dictate that a track not be initiated.

The three replies, one selected from each of three consecutive surveillance periods, each contain encoded altitude data. The altitude data includes eleven bits of Gilham code. Each altitude bit from the Gilham code for each reply has an associated confidence level, either high confidence or low confidence. If any of the eleven altitude bits are of low confidence, then the altitude reply is a garbled reply. If all of the altitude bits are of high confidence, then the altitude reply is an ungarbled reply. The altitude track initialization process applies if the altitude data is Gilham code, binary, or other encoded data with single bit errors.

Figure 5A:
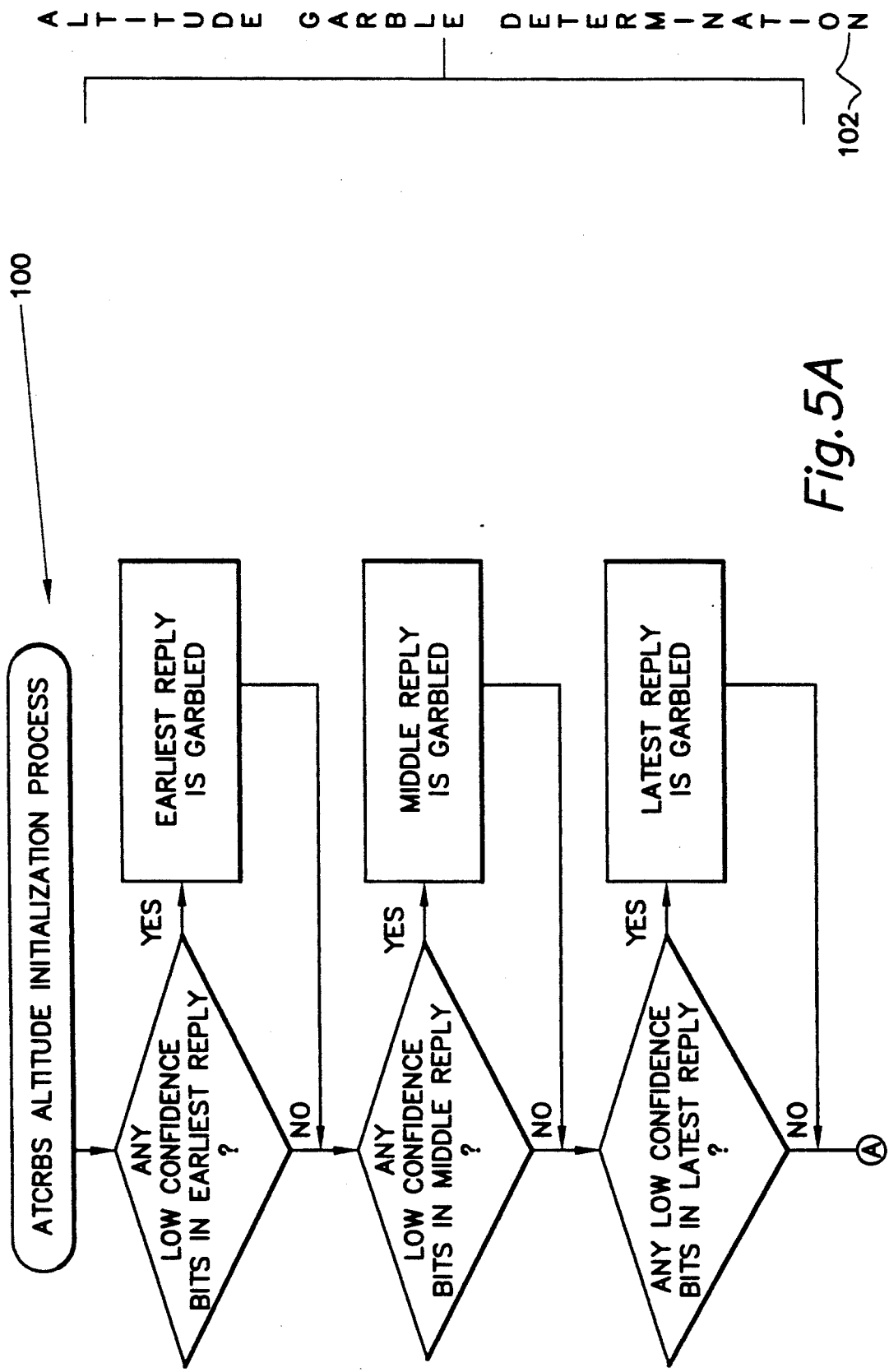
Figure 5C:
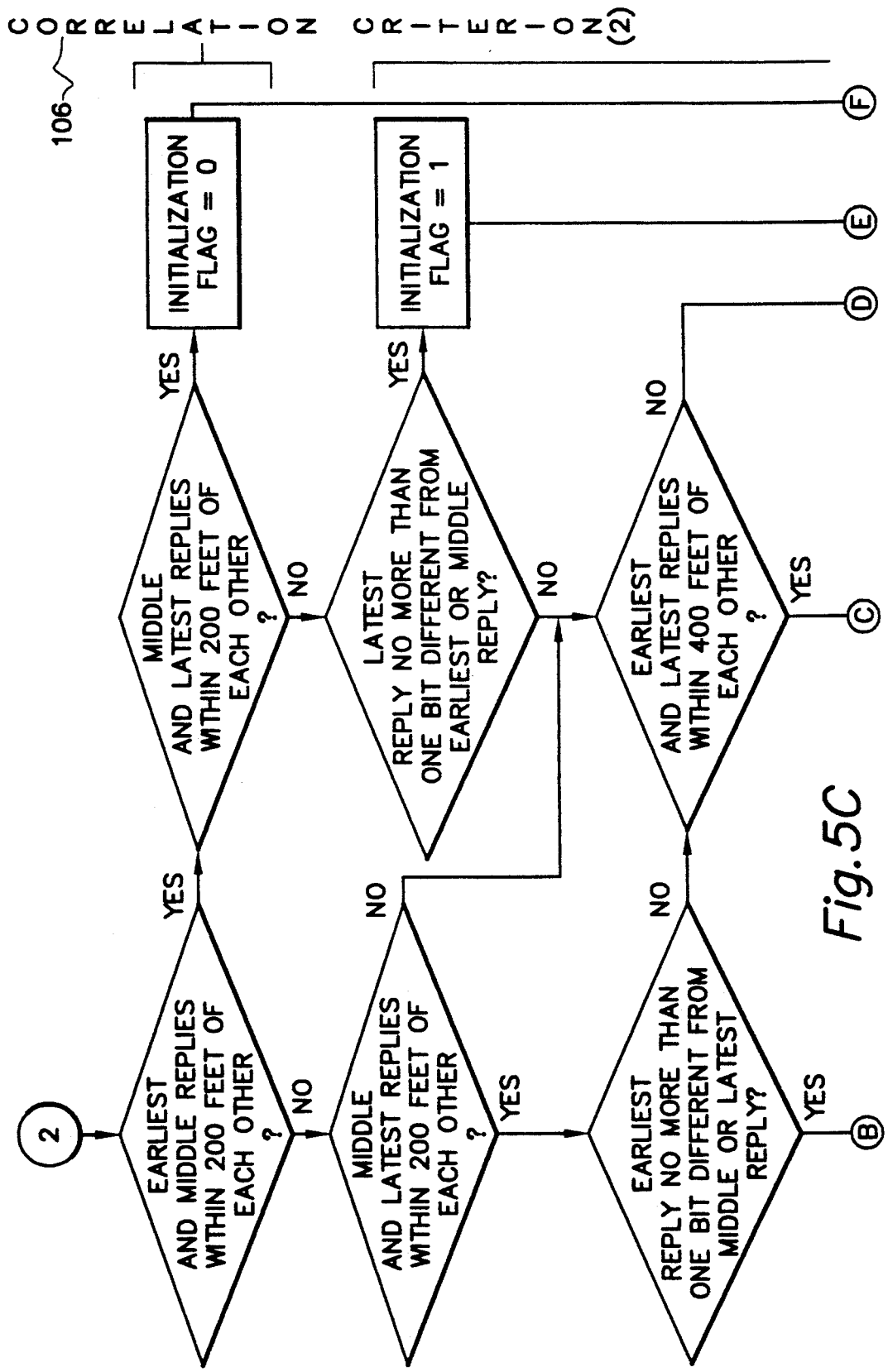
Figure 5E:
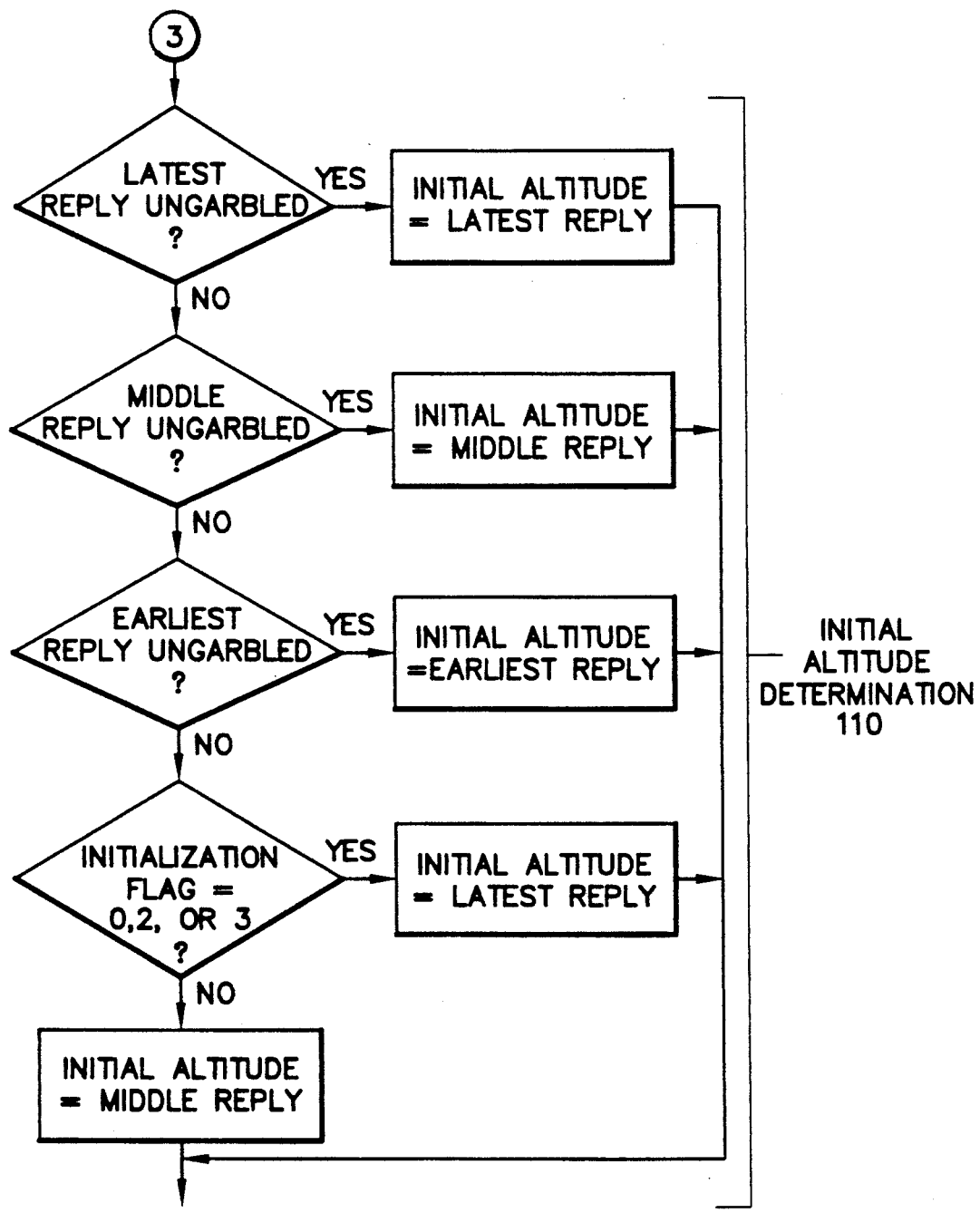
Figure 6A:
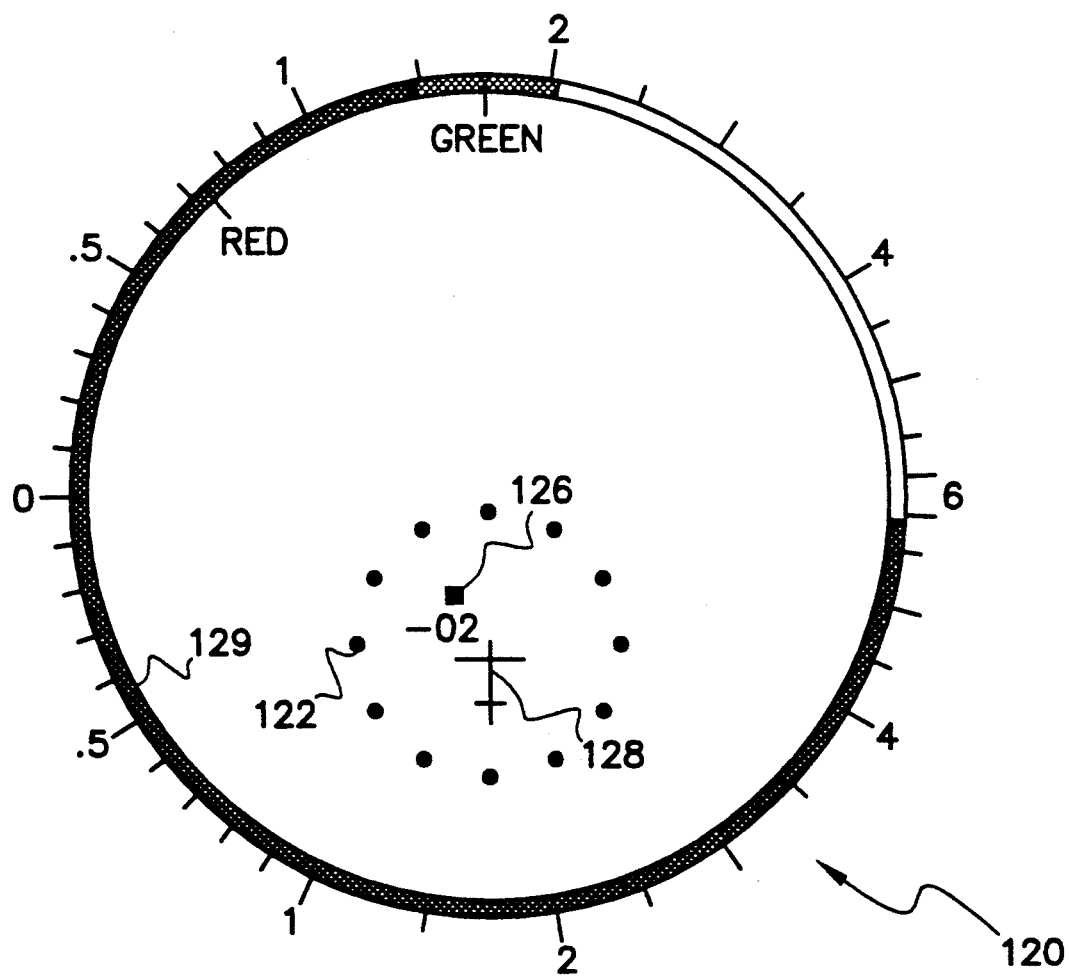
FIG. 6A–6B are diagrams of TCAS displays before and after implementation of the altitude initialization process of FIG. 5.

The altitude track initialization process 100, FIG. 5, is entered into with three altitude replies, one from a current surveillance period (latest reply) and one from each of two previous surveillance periods (middle and earliest replies). At the beginning of the altitude track initialization process 100, all the altitude replies are assumed to be ungarbled. The altitude track initialization process 100 can be separated into five steps: altitude garble determination 102, first correlation criterion 104, second correlation criterion 106, third correlation criterion 108, and initial altitude determination 110. The altitude garble determination 102 is performed by determining whether any altitude bits of the earliest reply are of low confidence, whether any of the altitude bits of the middle reply are of low confidence and whether any of the altitude bits of the latest reply are low confidence. If any of the bits of each of these replies are of low confidence, then the replies which contain the low confidence bits are labeled as garbled for use in the rest of the initialization process 100. If none of the altitude bits of a reply are low confidence, or in other words all are high confidence, then the reply is labeled non-garbled for use in the rest of the process 100.

Once the garble status of each altitude reply is determined, then three correlation criteria are applied to the three altitude replies to determine whether they correlate. Correlating replies refers to a set of three replies which may be used to initiate a track upon the satisfaction of any other requirements necessary for initiating a track and non-correlating replies refers to a set of replies which cannot be utilized to form a track. The correlation criteria include:

Correlation criterion 104—If the binary measured altitudes of any two adjacent non-garbled replies are more than 200 feet apart, or the binary measured altitudes of the earliest and latest replies are both ungarbled and more than 400 feet apart, the three reply altitudes do not correlate.

Correlation criterion 106—If the binary measured altitudes of each pair of adjacent replies are no more than 200 feet apart, the three reply altitudes correlate regardless of the garble status of the three replies.

Correlation criterion 108—If neither of the correlation criterion 104 or correlation criterion 106 apply, the altitudes correlate regardless of garble status if either the binary measured altitudes of a pair of adjacent replies are not more than 200 feet apart or the binary measured altitudes of the earliest and latest replies are not more than 400 feet apart, and the Gilham altitude of the reply with a non-corresponding binary altitude is not more than one bit different than the Gilham altitude of one of the replies with corresponding binary altitudes.

These three correlation criterion are applied in the manner as shown in FIG. 5. The first correlation criterion 104 includes determining whether the earliest and middle replies are ungarbled. If they are ungarbled, and the altitudes represented by the Gilham code of the earliest and middle replies are more than 200 feet apart, then an altitude track is not allowed to be initiated from these replies. Likewise, if the middle and latest replies are ungarbled and the middle and latest replies are more than two hundred feet apart, an altitude track cannot be initiated. Moreover, if the earliest and latest replies are ungarbled and the earliest and latest replies have an altitude of more than 400 feet apart, an altitude track cannot be initiated.

A determination made through correlation criterion 104 based on the ungarbled status of the three altitude replies and based on whether they show greatly separated altitudes, i.e. over 200 or 400 feet apart, is utilized to discard track initiation efforts at an early stage of the initialization process 100. The initialization table of MOPS as described in the Background of the Invention section herein, does not provide for early discarding of track initiating efforts based on replies with ungarbled, but greatly separated altitudes.

The second correlation criterion 106 is applied regardless of the garble status of the altitude replies. If the earliest and middle replies are within 200 feet of each other and if the middle and latest replies are within 200 feet of each other, the three replies correlate and a track may be initialized depending upon whether the other conditions necessary for initiating a track are satisfied.

The third correlation criterion 108 is also applied regardless of the garble status of the altitude replies. The third correlation criterion 108 can be separated into two separate steps. The first step is applicable to adjacent replies or replies from consecutive surveillance periods; for example, the latest and middle replies. The second step is applicable to non-adjacent replies or replies from non-consecutive surveillance periods; for example, the earliest and latest replies. It is first determined whether the adjacent replies correspond or in other words, whether the adjacent replies have binary measured altitudes no more than b 200 feet apart. If a pair of adjacent replies correspond, then if the reply which is not a part of the corresponding adjacent replies, or in other words, the non-corresponding reply, is no more than one bit different than the Gilham code of either of the replies from the corresponding adjacent replies, the three replies are said to correlate and the altitude conditions for initializing an altitude track is satisfied. Likewise, if the non-adjacent replies are within 400 feet of each other, then they correspond. If the non-adjacent replies correspond and the reply which is not a part of the corresponding non-adjacent replies, i.e. the middle reply, is no more than one bit different from the Gilham code of the replies of the corresponding non-adjacent replies, then once again, the three replies correlate and the altitude requirements for initializing a track are satisfied. Otherwise, the altitude conditions for initializing a track are not met.

Lastly, only if the three replies correlate in accordance with the correlation criterion, will the initial altitude determination 110 be used to determine the initial altitude of a track allowed to be formed from the three replies processed in accordance with the rest of the altitude initialization process 100. In accordance with initial altitude determination 110, if at least one reply is ungarbled, then the altitude from the most recent ungarbled reply is the altitude used as the initial altitude of the track allowed to be initialized. For example, if the latest reply is ungarbled, then the initial altitude is the altitude of the latest reply. If all of the replies are garbled, then the initial altitude is the altitude of the most recent reply of the pair of corresponding altitude replies, whether adjacent or non-adjacent. As indicated above, corresponding replies are either adjacent replies which have binary measured altitudes no more than 200 feet apart or non-adjacent replies which have binary measured altitudes of no more than 400 feet apart. If, for example, all three replies are garbled and the earliest and middle replies are within 200 feet of each other and thus are corresponding adjacent replies, the altitude of the middle reply is the initial altitude of the track allowed to be initialized if the three replies are said to correlate.

An example of the benefits of utilizing the altitude track initialization process 100 of the present invention, in addition to the benefit of reducing processing time by eliminating initiation attempts early on in the process as described above, are shown with reference to FIGS. 4 and 6. The altitude track initialization process 100 is applied to three replies 94, 96, and 98 in three consecutive surveillance periods 90, FIG. 4. The altitude replies have the following Gilham code associated therewith:

|  | Gilham Code [DABC Octal] | Garble Bits [DABC Octal] | Altitude [feet] |
| --- | --- | --- | --- |
| earliest | 0134 | 0000 | 5300 |
| middle | 0136 | 0002 | 5400 |
| latest | 0536 | 0002 | 24100 |

Altitude reply 94 is ungarbled and shows an altitude of 5300 feet, altitude reply 96 is garbled and shows an altitude of 5400 feet, and altitude reply 98 is garbled and shows an altitude of 24,100 feet.

Utilizing the altitude initialization table of MOPS, as described in the Background of the Invention section, would produce a track with an initial altitude of 24,200 feet. If a surveillance aircraft 128 had an altitude at 24,400 feet, the target aircraft would show up as a resolution advisory on both the traffic advisory and resolution advisory display portions of the composite resolution advisory and traffic advisory display 120, FIG. 6A, to the flight crew. The black box 126 represents the target aircraft and the -02 represents the altitude of the target aircraft with respect to the surveillance aircraft 128. The display of this target aircraft when such track representing such aircraft is false, distracts the pilot from more meaningful pursuits and may cause an unsafe maneuver command.

Figure 6B:
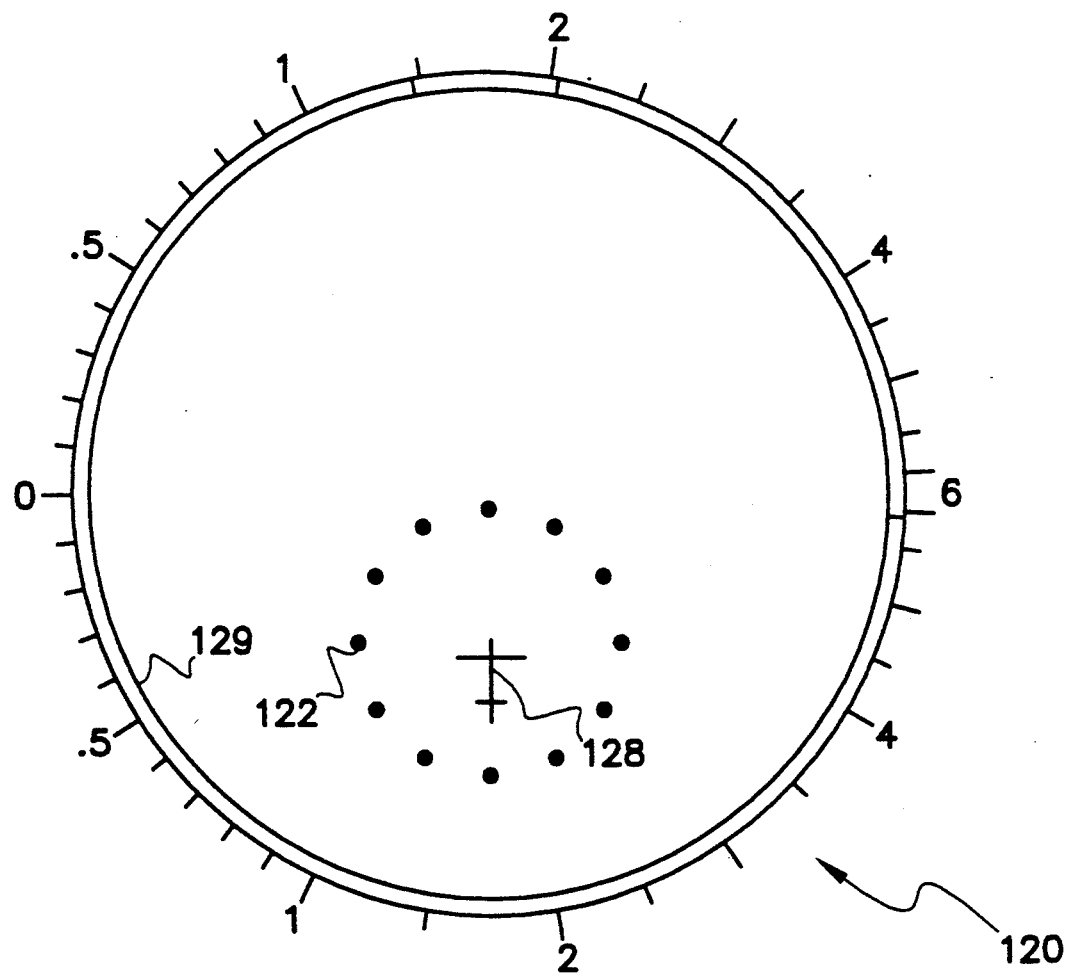

When the altitude track initialization process 100 of the present invention is utilized, the initial altitude of a track allowed to be initialized is at 5300 feet rather than 24,200 feet and does not show on display 120, FIG. 6B, as the target aircraft is outside the display limits of the surveillance aircraft in altitude, the altitude difference being over 15,000 feet. Therefore, the pilot is not distracted by a false altitude track and no incorrect or unnecessary maneuvering is commanded. In addition, a resolution advisory ring 129 associated only with a resolution advisory would not be displayed to the flight crew as no resolution advisory actually exists. The ring of dots 122 is a range ring which may be used by the flight crew as a range reference.

Applying the altitude track initialization process 100 to this example, it is seen that these three replies correlate in that the earliest and middle replies are within 200 feet of each other. Although, the middle and latest replies are not within 200 feet of each other, they are garbled and the latest reply is no more than one bit different from the earliest or middle reply and thus initialization flag=1 is achieved. Because the earliest reply is ungarbled and none of the other replies are ungarbled, the initial altitude of the track established from the correlating replies is equal to the altitude of the earliest reply, 5300 feet.

Those skilled in the art will recognize that only preferred embodiments of the present invention have been disclosed herein, other advantages may be found and realized, and various modifications may be suggested by those versed in the art, and it should be understood that the embodiment shown herein may be altered and modified without departing from the true spirit and scope of the invention as defined in the accompanying claims.

What is claimed is:

1. A method of processing a plurality of replies of target aircraft provided in response to interrogation signals from a surveillance aircraft during surveillance periods to determine whether an altitude track may be initialized for use in a traffic alert and collision avoidance system, said method comprising the steps of:
    selecting three replies, one from each of three consecutive surveillance periods, said replies having binary or coded altitude data of high or low confidence;
    comparing the binary or coded altitude data of non-adjacent and adjacent replies of the selected replies and generating an altitude difference value for each of the comparisons;
    discarding further efforts to initialize a track if any of the altitude difference values are greater than first predetermined separated altitudes if and only if such non-adjacent and adjacent replies have binary or coded altitude data of high confidence; and
    further comparing the binary or coded altitude data of the non-adjacent and the adjacent replies whether or not the replies have binary data of low or high confidence to determine whether an altitude track may be initialized.

2. A method according to claim 1, wherein said further comparing step comprises the steps of:
    correlating the selected replies such that the selected replies may be used to initialize an altitude track regardless of whether the replies have binary or coded altitude data of high or low confidence if the altitude difference values of compared adjacent replies are less than second predetermined separated altitudes; and
    correlating the replies regardless of whether the replies have binary or coded altitude data of high or low confidence if the altitude difference value of one of the compared adjacent replies or the non-adjacent replies is less than third predetermined separated altitudes and only if the binary or coded altitude data of the replies of said one of the compared adjacent replies or the non-adjacent replies is not more than one bit different than the binary or coded altitude of the reply which is not part of said one of the compared adjacent replies or the non-adjacent replies which was less than the third predetermined separated altitudes.

3. A method according to claim 2, further comprising the step of selecting an initial altitude of an altitude track allowed to be initialized upon correlation of the selected replies, the selecting step including the steps of:
    choosing the altitude of the reply of the most recent surveillance period if such reply has binary or coded altitude data of high confidence; and
    selecting the altitude of the reply in the most recent surveillance period of said one of adjacent replies or nonadjacent replies leading to the initialization of a track if all the selected replies have binary or coded altitude data of low confidence.

4. A method according to claim 1, wherein said first predetermined separated altitudes include a non-adjacent predetermined altitude separation for comparison to altitude difference values of compared non-adjacent replies and an adjacent predetermined altitude separation for comparison to altitude difference values of compared adjacent replies, the adjacent predetermined altitude separation being less than the non-adjacent predetermined altitude separation.

5. A method of processing a plurality of replies of target aircraft provided in response to interrogation signals from a surveillance aircraft during surveillance periods to determine whether an altitude track may be initialized for use in a traffic alert and collision avoidance system, said method comprising the steps of:
    selecting a reply having binary or coded altitude data of high or low confidence from three consecutive surveillance periods;
    comparing the binary or coded altitude data of each of the selected replies to the binary or coded altitude data of the other selected replies;
    generating altitude value differences representative of a difference in altitude of each comparison and bit difference values representative of whether a certain number of bits of the binary or coded altitude data are different for the replies of each comparison; and
    comparing the altitude value differences to predetermined altitude difference values and the bit difference values to a predetermined number of bits to determine depending on whether the binary or coded altitude data is of high or low confidence whether the altitude track may be initialized from the selected replies.

6. A method according to claim 5, wherein the step of comparing the altitude value differences with the predetermined altitude difference values and the bit difference values to the predetermined number of bits comprises the steps of:
    comparing the altitude value differences of each comparison of replies to first predetermined altitude difference ranges if the binary or coded altitude data of each selected reply is of high confidence;
    allowing an altitude track to be initialized if all the altitude value differences of each comparison fall within the first predetermined altitude difference ranges;
    comparing the altitude value differences of comparisons of replies made between adjacent selected replies to second predetermined altitude difference ranges whether or not the binary or coded altitude data of the replies is of low or high confidence;
    allowing an altitude track to be initialized if all the altitude value differences of comparisons made between adjacent selected replies fall within the second predetermined altitude difference ranges;
    comparing the altitude value differences of each comparison of replies to third predetermined altitude difference ranges and the bit difference values of each comparison of replies to the predetermined number of bits whether or not the binary or coded altitude data is of low or high confidence; and
    allowing an altitude track to be initialized if the altitude value differences of comparisons of adjacent selected replies fall within the third predetermined altitude difference ranges and the bit difference values of each reply of the adjacent replies which fall within the third predetermined altitude difference ranges as compared to the reply which is not one of the adjacent replies are less than the predetermined number of bits and allowing an altitude track to be initialized if the altitude value difference of the comparison of non-adjacent selected replies falls within the third required altitude difference ranges and the bit difference values of each of the replies of the non-adjacent replies which fall within the third predetermined altitude ranges compared to the reply which is not one of the non-adjacent replies are less than the predetermined number of bits.

7. A method according to claim 5, further comprising the step of:

selecting an initial altitude for a track allowed to be initialized by choosing either the altitude of the most recent reply of the selected replies having high confidence binary or coded altitude data or the altitude of the most recent reply of a comparison of adjacent or non-adjacent replies which resulted in the track being allowed to be initialized if the binary or coded altitude data for all the replies are of low confidence.

* * * * *